United States Patent [19]
Baars et al.

[11] Patent Number: 5,866,176
[45] Date of Patent: Feb. 2, 1999

[54] MOULDING SYSTEM FOR MOULDING A MASS SUCH AS A MASS OF MEAT

[75] Inventors: johannes Antonius Barbara Maria Baars, Bakel; Jacobus Johannes Maria Van Der Laak, Milheeze; Johannes Gertrudes Simon Driessen, Asten, all of Netherlands

[73] Assignee: Koppens B.V., Bakel, Netherlands

[21] Appl. No.: 850,513

[22] Filed: May 2, 1997

[30] Foreign Application Priority Data

Jul. 11, 1996 [NL] Netherlands ............... 1003568

[51] Int. Cl.$^6$ ............... A22C 7/00; B29C 43/34
[52] U.S. Cl. ............... 425/256; 425/420; 425/448; 425/449; 425/812; 425/DIG. 127; 249/141
[58] Field of Search ............... 425/238, 239, 425/190, 193, 256, 448, 449, DIG. 127, 420, 812; 426/512; 249/141

[56] References Cited

U.S. PATENT DOCUMENTS

| | | | |
|---|---|---|---|
| 4,126,704 | 11/1978 | McCarthy et al. | 426/512 |
| 4,356,595 | 11/1982 | Sandberg et al. | 426/512 |
| 4,832,961 | 5/1989 | Aoki | 425/437 |
| 5,030,164 | 7/1991 | Wagner | 452/174 |
| 5,618,571 | 4/1997 | London et al. | 426/512 |

FOREIGN PATENT DOCUMENTS

| | | |
|---|---|---|
| 39 40 225 | 3/1991 | Germany . |
| 9 301 248 | 2/1995 | Netherlands . |

*Primary Examiner*—Khanh P. Nguyen
*Attorney, Agent, or Firm*—Young & Thompson

[57] ABSTRACT

A moulding system for moulding a mass with a pasty or dough-like composition, such as a mass of meat, for example for moulding hamburgers, includes a housing having a chamber which is delimited by internal walls of the housing. The chamber emerges on the outside of the housing. A displaceable mould plate, which is formed in a manner corresponding to the chamber, fits with a small degree of play into the chamber and has at least one mould cavity. The housing has a feed opening, which opens into the chamber, for the mass to be moulded, such that, in the position in which the mould plate has been slid into the housing, the mould cavity is in communication with the feed opening and, in the position in which the mould plate has been slid out of the housing, the mould cavity is situated outside the housing. One of the internal walls of the chamber, in the region of the feed opening, has a recess in which a pressure-exerting member is situated, which bears with prestressing against the mould plate in order to provide a good seal and cutting action.

8 Claims, 4 Drawing Sheets

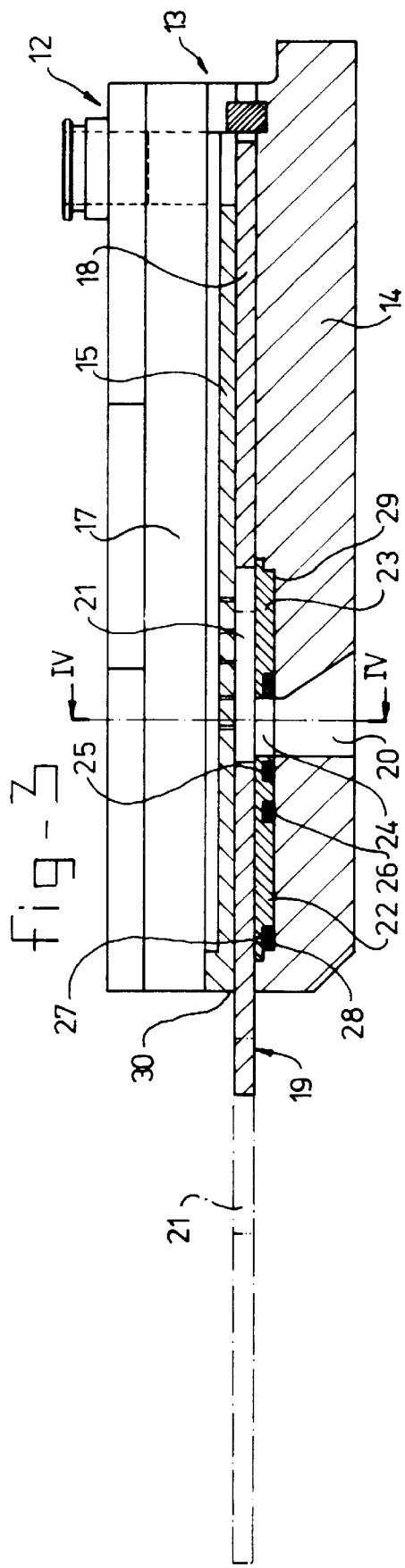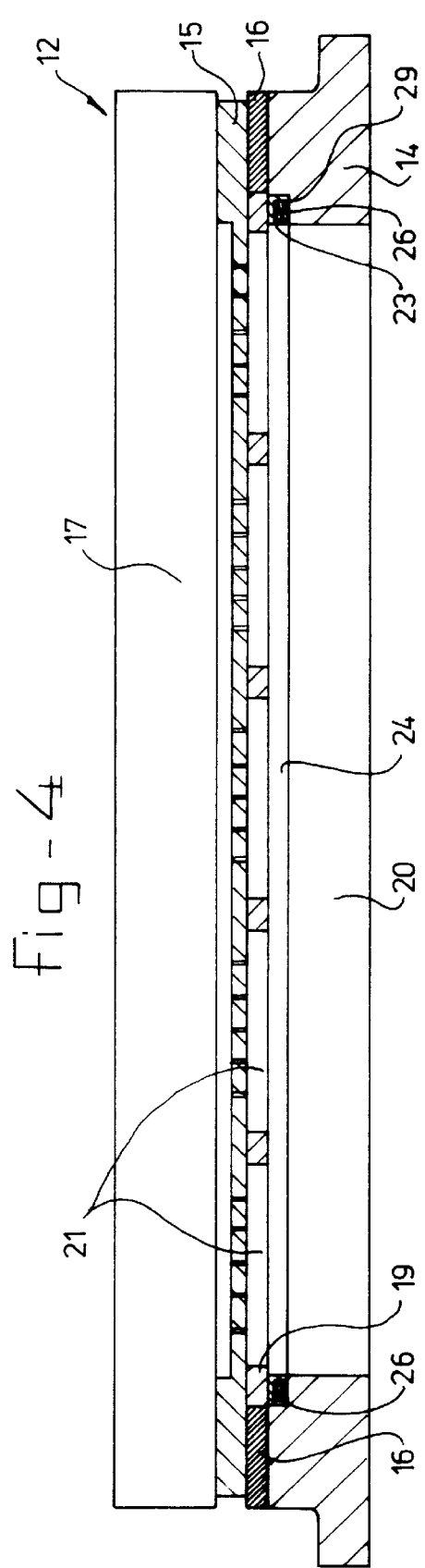

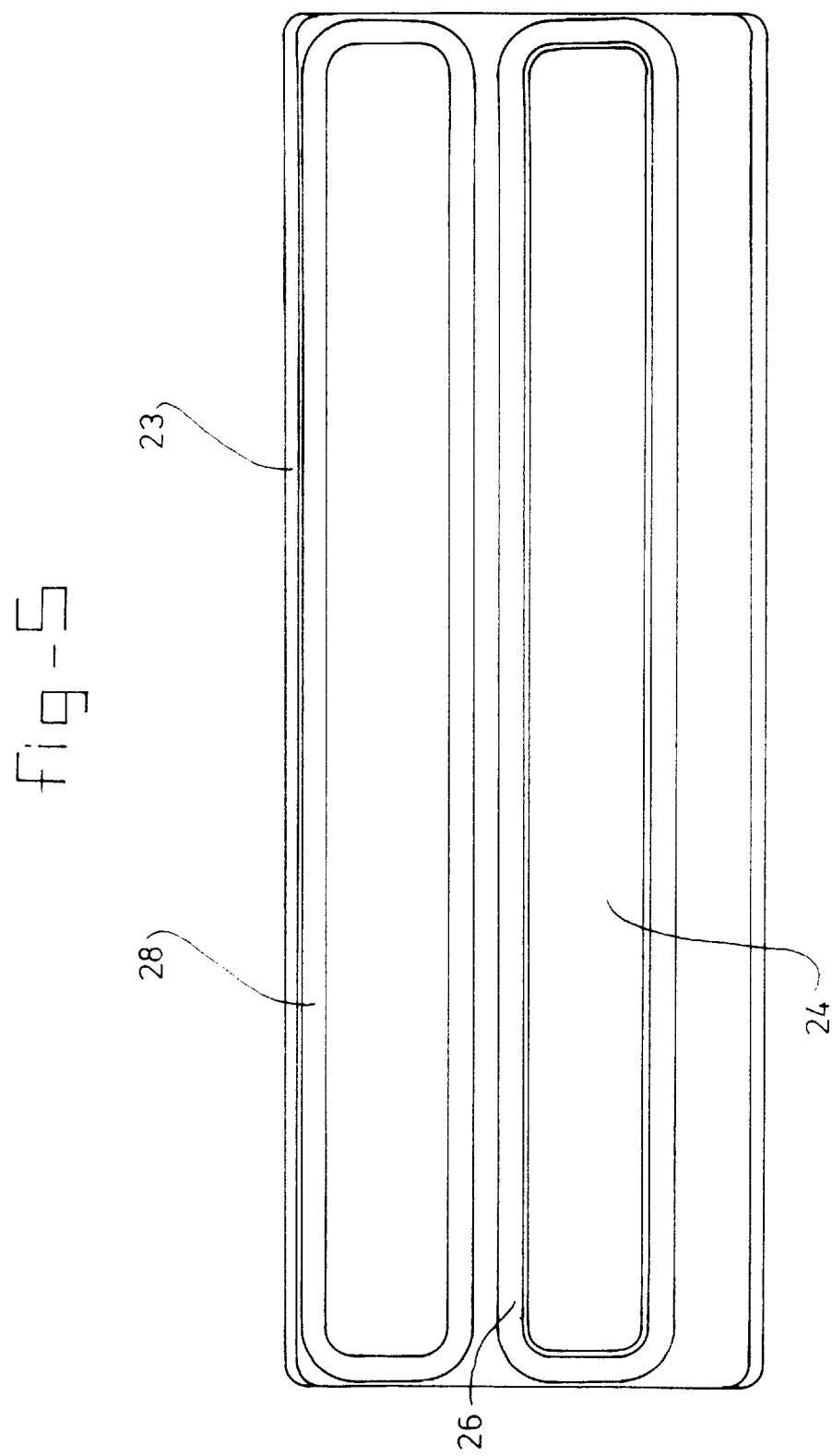

MOULDING SYSTEM FOR MOULDING A MASS SUCH AS A MASS OF MEAT

The invention relates to a moulding system for moulding a mass with a pasty or dough-like composition, such as a mass of meat, for example for moulding hamburgers, comprising a housing having a chamber which is delimited by internal walls of the housing, which chamber emerges on the outside of the housing, as well as a displaceable mould plate, which is formed in a manner corresponding to the chamber, fits with a small degree of play into the chamber and has at least one mould cavity, which housing has a feed opening, which opens into the chamber, for the mass to be moulded, such that, in the position in which the mould plate has been slid into the housing, the mould cavity is in communication with the feed opening and, in the position in which the mould plate has been slid out of the housing, the mould cavity is situated outside the housing.

BACKGROUND OF THE INVENTION

A moulding system of this kind is known from NL-A-9301248. The mould plate is situated in a housing which on the underside has a base plate with a feed opening, and on the top side has a ventilation plate for allowing air which is entrained during the feed of the mass and the air which is entrained during the return movement of the mould plate to escape. The base plate and the ventilation plate are held apart from one another by means of lateral guides, which are slightly thicker than the mould plate, so that the latter can move smoothly.

Owing to these slightly thicker lateral guides, the mould plate fits into the chamber with a small degree of play; since the mould plate is filled under pressure, leakage then occurs as a result. Meat juices and/or runny meat run out between the mould plate and the base plate, leading to loss.

SUMMARY OF THE INVENTION

The object of the invention is to provide a moulding system in which this leakage loss is as low as possible. This object is achieved in that one of the internal walls of the chamber, in the region of the feed opening, has a recess in which a pressure-exerting member is situated, which bears with prestressing against the mould plate. For this purpose, spring elements may be situated between the pressure-exerting member and the mould plate.

The bearing with prestressing ensures that the play between the mould plate and the internal top wall of the chamber is eliminated, as a result of which scarcely any leakage can take place.

The pressure-exerting member is preferably situated on that wall of the chamber at which the feed opening emerges and has an opening which coincides with the feed opening.

According to a preferred embodiment, the pressure-exerting member is a pressure plate and the recess is formed in a manner corresponding to the pressure plate.

The spring element may be of very varied design. For example, a plurality of regularly distributed spring elements may be used. According to the invention, the pressure plate may have a groove, which runs around the feed opening, on the side facing the wall of the chamber, in which groove an encircling spring element is situated. An excellent seal around the feed opening can be ensured by means of an encircling spring element of this kind.

A further improvement of the seal can be achieved if the pressure plate has a further groove with spring element on its part which faces the mouth of the chamber.

The invention relates to a moulding machine for moulding a mass with a pasty or dough-like composition, such as a mass of meat, for example for moulding hamburgers, comprising a container for the mass to be moulded, pressing means for transporting the mass from the container to a moulding system, as well as discharge means for discharging the moulded products from the moulding system, which moulding system has a housing having a chamber which is delimited by internal walls of the housing, which chamber emerges on the outside of the housing, as well as a displaceable mould plate, which is formed in a manner corresponding to the chamber, fits with a small degree of play into the chamber and has at least one mould cavity, which housing has a feed opening, which opens into the chamber, for the mass to be moulded, such that, in the position in which the mould plate has been slid into the housing, the mould cavity is in communication with the feed opening and, in the position in which the mould plate has been slid out of the housing, the mould cavity is situated outside the housing.

According to the invention, one of the internal walls of the chamber, in the region of the feed opening, has a recess in which a pressure-exerting member is situated, which bears with prestressing against the mould plate.

BRIEF DESCRIPTION OF THE DRAWINGS

The invention will now be explained in more detail with reference to an exemplary embodiment depicted in the figures.

FIG. 3 shows the moulding system in side view.

FIG. 4 shows the moulding system along view IV—IV in FIG. 3.

FIG. 5 shows a bottom view of part of the pressure plate.

DETAILED DESCRIPTION OF THE INVENTION

Figure 1:
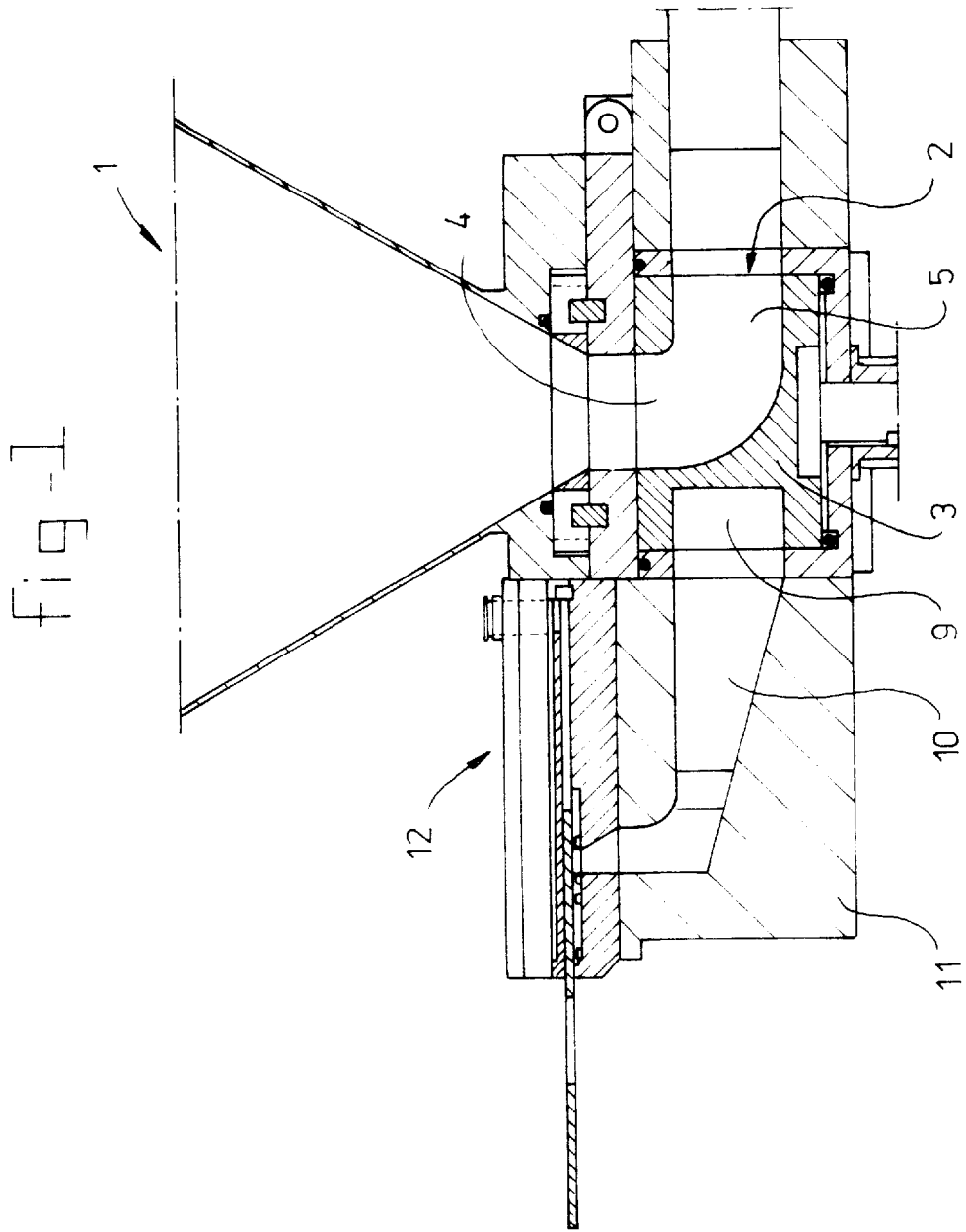
FIG. 1 shows a moulding machine with a moulding system according to the invention.
Figure 2:
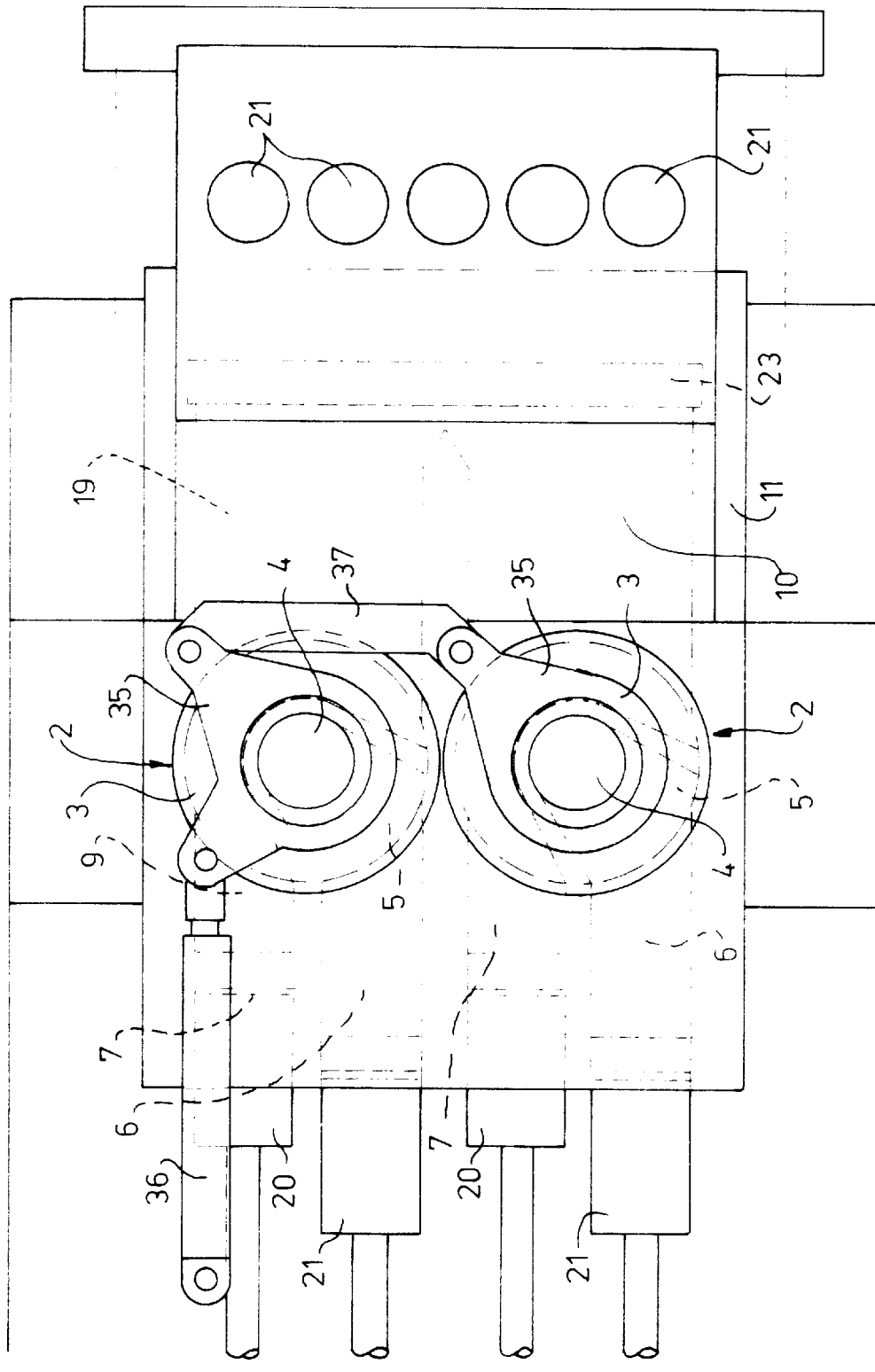
FIG. 2 shows a top view of the moulding machine of FIG. 1.

The moulding machine depicted in FIGS. 1 and 2 comprises a funnel-like container 1, which at its underside opens into two rotary valves 2. These valves 2 each have a rotary valve body 3, the vertical limb 4 of which opens into the funnel 1, and the horizontal limb 5 of which can be alternately connected to piston-cylinder device 6 (in the situation of FIG. 2) and 7.

As can be seen in FIGS. 1 and 2, the piston-cylinder devices 7 which are not in interaction with the valve bodies 3 are connected via the passage 9 to the feed 10 in the block 11. According to the invention, the moulding system, which is denoted overall by 12, is arranged on this moulding machine, as can be seen in FIG. 1.

As can also be seen in FIGS. 3 and 4, the moulding system 12 has a housing, which is denoted overall by 13 and comprises a base plate 14, a ventilation plate 15, lateral guides 16 between these two components (see FIG. 4) and a closure plate 17 which holds the parts 14, 15 and 16 pressed against one another. The ventilation plate 15 has ventilation holes 30.

The lateral guides 16, base plate 14 and ventilation plate 15 delimit a chamber 18, in which the mould plate 19 can be displaced between a position moved inwards, which is shown in continuous lines, and a position moved outwards, shown by broken lines.

The base plate 14 has a feed opening 20 which is connected to the feed 10 of the block 11, as shown in FIG.

1. In the moved-in position of the mould plate 19, the mould cavities 21 arranged therein are in communication with the feed opening 20.

According to the invention, the base plate is provided with a recess 22, in which pressure plate 23 is situated.

Pressure plate 23 is shown in FIG. 5 and has an opening 24 which is aligned with the feed opening 20 in the base plate 14.

A groove 25 is arranged around this feed opening 24, in which groove a likewise encircling spring element 26, for example a rubber ring or an O-ring, is situated.

This spring element is supported on the base plate 14, on its region around the feed opening 20. As a result, the pressure plate is held firmly pressed against the mould plate 19, so that any play of the mould plate 19 in the internal chamber 18 in the housing 13 is eliminated, in the region of the feed opening 20. The spring element 26 also seals the gap between the pressure plate 23 and recess 22.

By dint of this resilient pressure, scarcely any leakage now takes place between the pressure plate 23 and the mould plate 19. Moreover, this pressure plate, interacting with the mould plate 19, also has a cutting action, such that the fibres of the mass, such as meat fibres, are reliably severed when the mould plate 19 is displaced to its outwardly projecting position.

In order further to improve the seal of the pressure plate 23 with respect to the mould plate 19, a further groove 27 is provided, in which an additional spring element 28 is situated.

We claim:

1. A moulding apparatus for moulding a mass having a pasty composition, comprising:
    a housing including a base plate, a ventilation plate and walls;
    a chamber defined by the base plate, the ventilation plate and the walls;
    a feed opening formed in the base plate and opening into the chamber;
    a movable mould plate having at least one moulding cavity, and being movable into the chamber to allow the mould cavity to communicate with the feed opening, and out of the chamber to allow a moulded product to be removed from the mould cavity;
    a recess formed in one of the walls, and around the feed opening; and
    a pressure-exerting member situated in the recess, and including means for exerting pressure to press the pressure-exerting member against the mould plate to provide a good seal and cutting action.

2. The moulding apparatus according to claim 1, wherein the means for exerting pressure comprise spring elements situated between the pressure-exerting member and the base plate.

3. The moulding apparatus according to claim 1, wherein the pressure-exerting member is situated on a wall of the chamber where the feed opening emerges.

4. The moulding apparatus according to claim 3, wherein the pressure-exerting member has an opening which coincides with the feed opening.

5. The moulding apparatus according to claim 4, wherein the pressure-exerting member is a pressure plate.

6. The moulding apparatus according to claim 5, wherein the pressure plate has a groove, which runs around the opening, on a side remote from the chamber, and an encircling spring element is situated in said groove.

7. The moulding apparatus according to claim 6, wherein the pressure plate has a further groove in which another spring element is situated.

8. A moulding machine for moulding a mass having a pasty composition, comprising:
    a container for the mass to be moulded;
    pressing means operatively associated with the container for transporting the mass from the container to a moulding system; and
    discharge means for discharging a moulded product from the moulding system;
    said moulding system comprising:
        a housing including a base plate, a ventilation plate and walls;
        a chamber defined by the base plate, the ventilation plate and the walls;
        a feed opening formed in the base plate and opening into the chamber;
        a movable mould plate having at least one moulding cavity, and being movable into the chamber to allow the mould cavity to communicate with the feed opening, and out of the chamber to allow a moulded product to be removed from the mould cavity;
        a recess formed in one of the walls, and around the feed opening; and
        a pressure-exerting member situated in the recess, and including means for exerting pressure to press the pressure-exerting member against the mould plate to provide a good seal and cutting action.

* * * * *